US012632021B2

(12) United States Patent
Chis et al.

(10) Patent No.: US 12,632,021 B2
(45) Date of Patent: May 19, 2026

(54) INDUSTRIAL SYSTEM MOBILE CHAIN COMPUTING

(71) Applicant: Rockwell Automation Technologies, Inc., Mayfield Heights, OH (US)

(72) Inventors: Marius G. Chis, Cambridge (CA); Ryan Coon, Franklin, WI (US); Scott D. Day, Richfield, WI (US); David C. Mazur, Grafton, WI (US); Jonathan A. Mills, Mayfield Heights, OH (US); Michael T. Trader, Sussex, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 375 days.

(21) Appl. No.: 18/315,005

(22) Filed: May 10, 2023

(65) Prior Publication Data

US 2024/0377795 A1     Nov. 14, 2024

(51) Int. Cl.
*G05B 15/02*          (2006.01)

(52) U.S. Cl.
CPC .................................... *G05B 15/02* (2013.01)

(58) Field of Classification Search
CPC .............. G05B 15/02; G05B 19/41845; G05B 19/4185
See application file for complete search history.

(56) References Cited

U.S. PATENT DOCUMENTS

| | | | |
|---|---|---|---|
| 6,167,464 A | 12/2000 | Kretschmann | |
| 7,352,141 B2 | 4/2008 | Kling | |
| D612,339 S | 3/2010 | Braun | |
| 8,782,539 B2 | 7/2014 | Bump | |
| 9,653,910 B2 | 5/2017 | Drake | |
| 10,282,285 B2 | 5/2019 | Braun | |
| D862,399 S | 10/2019 | Andersson | |
| 10,572,162 B2 | 2/2020 | Rantanen | |
| 10,606,742 B2 | 3/2020 | Braun | |
| 10,924,053 B2 | 2/2021 | Hu | |
| 11,182,146 B2 | 11/2021 | Tunkkari | |
| 11,303,625 B2 | 4/2022 | Hu | |
| 11,409,269 B2 | 8/2022 | Hu | |
| 2010/0079096 A1 | 4/2010 | Braun | |
| 2015/0287318 A1* | 10/2015 | Nair ....................... G06Q 10/10 340/5.6 |
| 2020/0132773 A1 | 4/2020 | Gugaliya | |
| 2021/0141628 A1 | 5/2021 | Garrabrant | |

OTHER PUBLICATIONS

User Manual, PowerFlex 20-HIM-A6 and 20HIM-C6S HIM (Human Interface Module), Rockwell Automation Publication 20HIM-UM001E-EN-P—May 2017, 74 pages.
User Manual, "Configuration and Tuning Terminal Type CTT02", Bailey Product Instruction E92-501-2, 1989, 204 pages.
Specification, "Control Solutions Strategic Loop Controller Series SLC", ABB Automation S-CS/CMD-SLC_1, 2000, 12 pages.

* cited by examiner

*Primary Examiner* — Kenneth M Lo

(57) ABSTRACT

A method includes, using a mobile device connected to an industrial network of an industrial system, receiving a chainable compute service assignment from a first intelligent industrial device of the industrial system that assigns a chainable compute service to the mobile device or assignment from a cloud-based device or system connected to the industrial network that assigns the chainable compute service to the mobile device; and using the mobile device, performing the chainable compute service.

22 Claims, 4 Drawing Sheets

INDUSTRIAL SYSTEM MOBILE CHAIN COMPUTING

BACKGROUND INFORMATION

The subject matter disclosed herein relates to industrial systems and apparatus.

BRIEF DESCRIPTION

In one aspect, a method, includes: using a mobile device connected to an industrial network of an industrial system, receiving a chainable compute service assignment from a first intelligent industrial device of the industrial system that assigns a chainable compute service to the mobile device or from a cloud-based device or system connected to the industrial network that assigns the chainable compute service to the mobile device; and using the mobile device, performing the chainable compute service.

In another aspect, an industrial system includes an industrial network and an intelligent industrial device operatively connected to the industrial network, the industrial network configured to connect a mobile device to the industrial system and deliver a chainable compute service assignment from the intelligent industrial device that assigns a chainable compute service to the mobile device or from a cloud-based device or system connected to the industrial network that assigns the chainable compute service to the mobile device to cause the mobile device to perform the chainable compute service.

In a further aspect, a non-transitory computer readable medium has computer executable instructions which, when executed by a processor of a mobile device connected to an industrial network of an industrial system, cause the mobile device to receive a chainable compute service assignment from an intelligent industrial device of the industrial system that assigns a chainable compute service to the mobile device or from a cloud-based device or system connected to the industrial network that assigns the chainable compute service to the mobile device, and to perform the chainable compute service.

DETAILED DESCRIPTION

Figure 1:
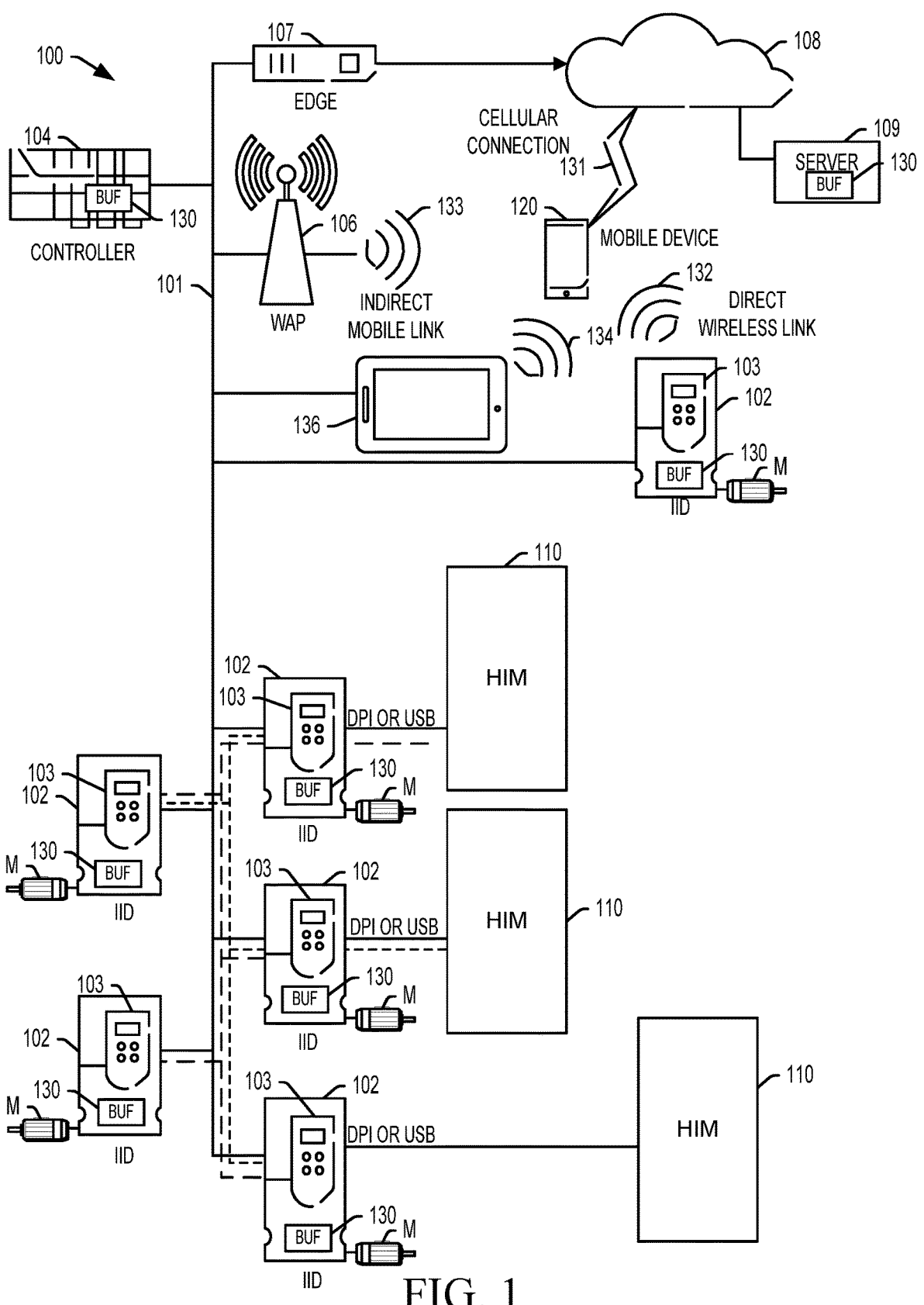
FIG. 1 is a system diagram of an industrial system.

Referring now to the figures, several embodiments or implementations are hereinafter described in conjunction with the drawings, wherein like reference numerals are used to refer to like elements throughout, and various features are not necessarily drawn to scale.

FIG. 1 shows an industrial system 100 having an industrial network 101 and intelligent industrial devices (IID) 102 (e.g., labeled IID in FIG. 1) operatively connected to the industrial network 101. The illustrated system 100 has various possible components, but the illustrated and described components are not all necessary for a given implementation and other system implementations can have more, fewer and/or different components depending on the application. The system 100 also includes one or more human interface modules 103 (also referred to as HIMs) operatively coupled to an associated one of the intelligent industrial devices 102 and/or to the industrial network 101. The industrial network 101 can be or include any suitable type and form of communications with communications lines and equipment, wired and/or wireless, network communications bridging equipment, etc., for example industrial Ethernet or Ethernet/IP, fieldbus compliant networks, etc., configured to support communications between connected devices and systems using one or more protocols, and may include bridges or adapters for interfacing devices communicating on different protocols. The intelligent industrial devices 102 can be any form or type of industrial control component or system, for example, motor drives operative to drive a motor load M as schematically illustrated in FIG. 1, power supplies, other types and forms of industrial control equipment, etc. The industrial system 100 may also include one or more controllers 104 (e.g., rack mounted modules programmable logic controllers (PLCs), I/O modules, etc.) operatively coupled to the industrial network 101, a wireless access point (WAP) 106 operatively coupled to the industrial network 101, and a network edge device 107 operatively coupled with the industrial network 101 to provide communications between the industrial network 101 and a cloud connection 108 to a server 109 and/or other external networks, components and/or systems (not shown). The industrial system 100 and the components thereof provide control and actuator functions to operate an industrial system, such as a manufacturing facility or machines thereof, such as conveyors, motors, valves, power supplies, etc., including operation of one or more connected or independent control loops implemented by processors (not shown) of one or more of the intelligent industrial devices 102, the controller 104, and/or of a remote system such as the cloud-based server 109. In certain implementations, one or more of the intelligent industrial devices 102, the controller 104, and/or the cloud-based server 109 include buffer memories 130 used to store data such as process conditions, sensor values, control values and/or parameters, etc.

Figure 1A:
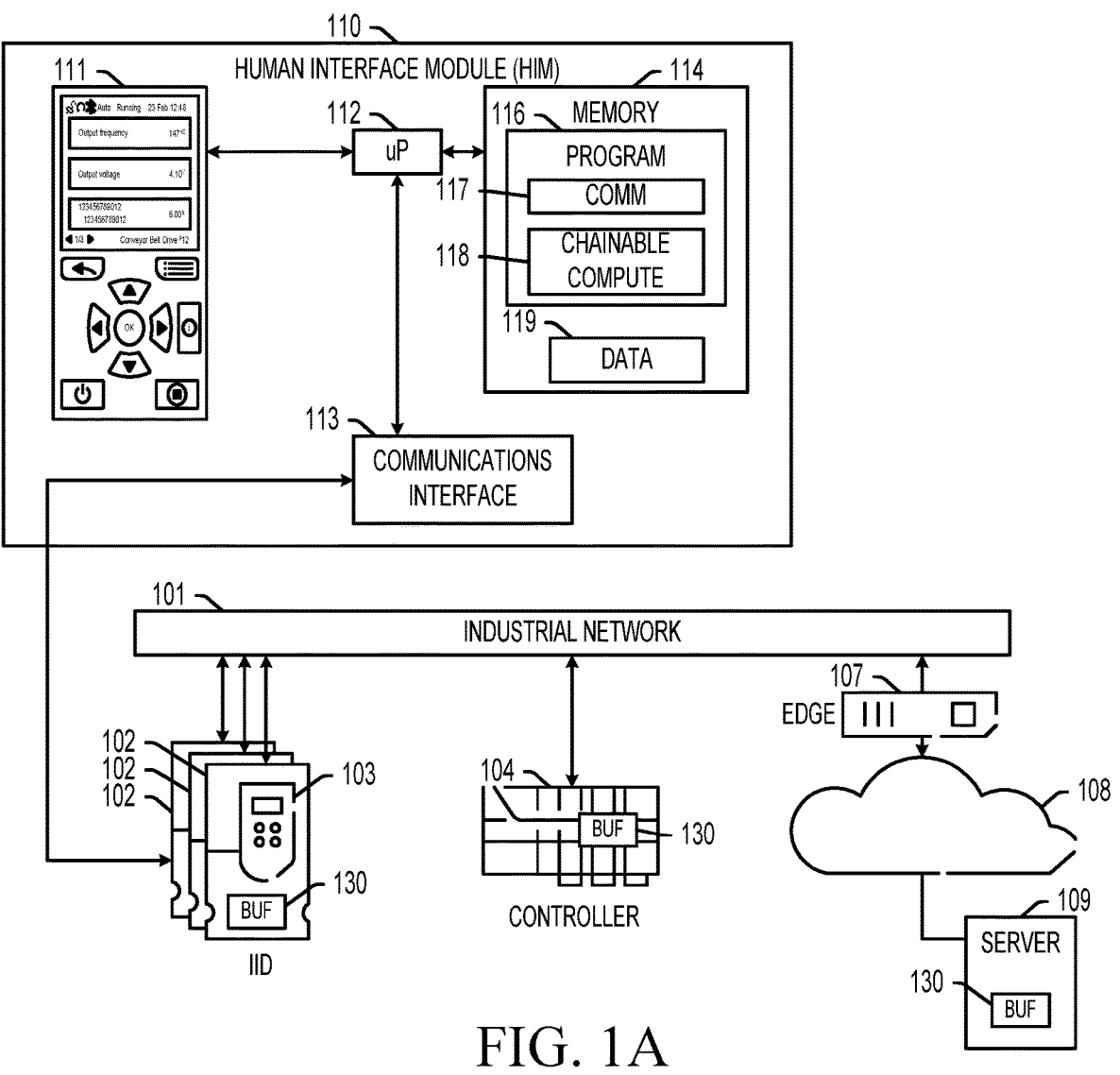
FIG. 1A is a schematic diagram of a human interface module of the industrial system.
Figure 1B:
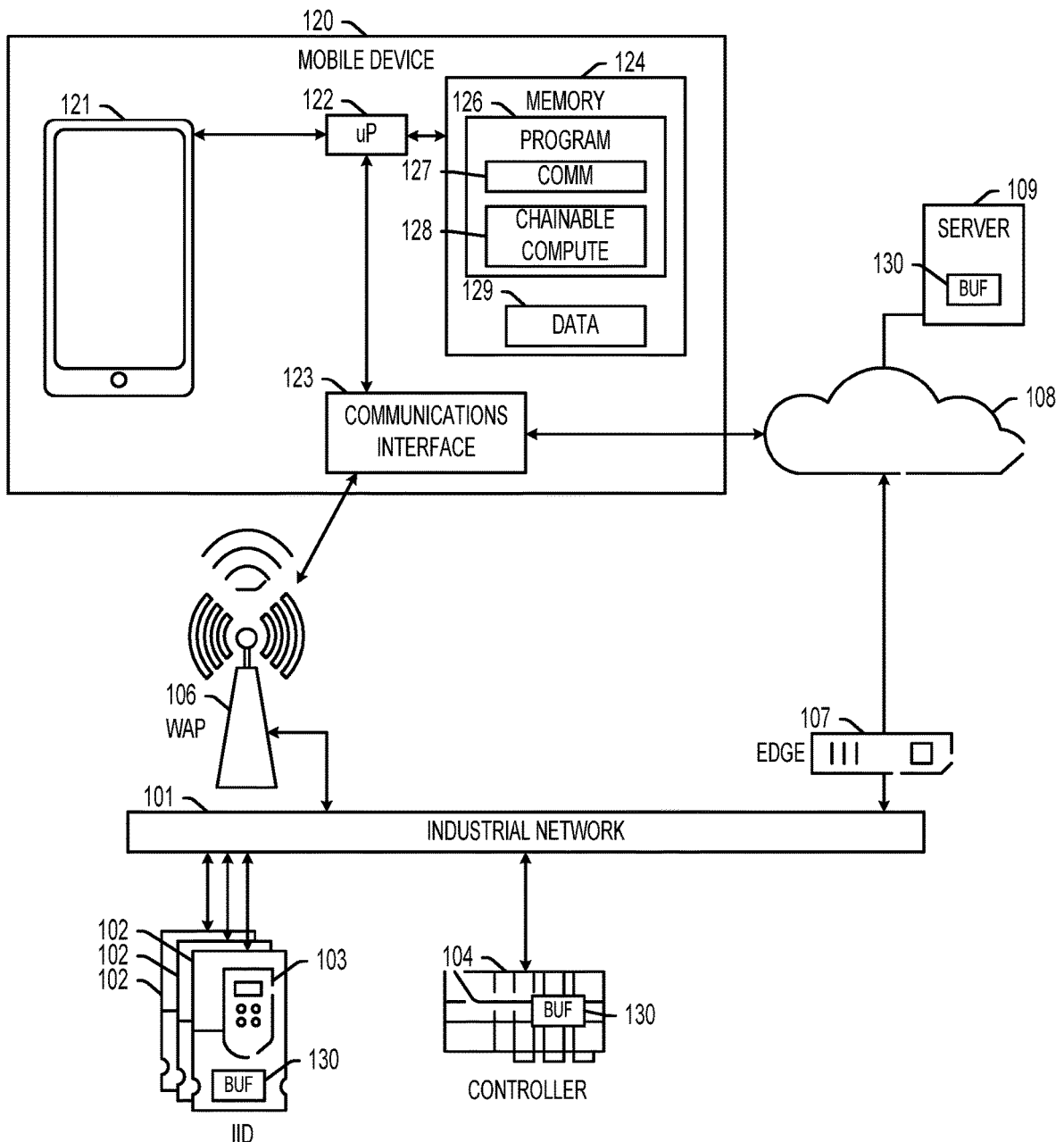
FIG. 1B is a schematic diagram of a mobile device operatively coupled to the industrial system.

The industrial system 100 in one example also includes intelligent HIMs 110 operatively coupled to an associated one of the intelligent industrial devices 102 and/or to the industrial network 101. The HIMs 110 can include human-machine interface devices and systems, such as displays, keyboards or keypads, speakers, microphones, etc. FIG. 1A illustrates an example HIM 110 of the industrial system 100. FIG. 1 further illustrates a mobile device 120 that can be operatively coupled to the devices 102 and other components of the system 100 and to the industrial network 101 by various structures, for example, cellular or other wired or wireless connections to the industrial network 101 via the cloud connection 108 and the network edge device 107 (shown as an optional cellular connection 131 in FIG. 1), wired or wireless connections to one of the intelligent industrial devices 102 and/or to an associated HIM 103 (e.g., shown as a direct wireless link 132 in FIG. 1), a wireless connection via the WAP 106 (e.g., shown as an indirect mobile link 133 in FIG. 1), and/or a wireless connection 134 established between the mobile device 120 and an advanced HIM 136, such as a tablet device operatively coupled by wired or wireless communications to the industrial network 101 as shown in FIG. 1. FIG. 1B shows an example implementation of the mobile device 120 operatively coupled to the industrial system 100.

As shown in the example of FIG. 1A, the intelligent HIMs 110 include an operator or user interface 111, having a graphic and/or textual visual display and various keypad buttons to allow a user to interact with the HIM 110 and an associated one of the intelligent industrial devices 102, as well as a processor 112 operatively coupled with a communications interface 113 operatively coupled with the industrial network 101 and an electronic memory 114. The electronic memory 114 includes processor executable instructions to implement a program 116, including a communications component 117 and a chainable compute component 118, as well as data storage 119. The program instructions 116 in one example implement the functions described herein. In operation, the HIM 110 communicates with one or more of the intelligent industrial devices 102 and/or associated local HIMs 103, as well as with the controller 104 and/or the cloud-based server 109 via the cloud connection 108 as schematically illustrated in FIG. 1A.

FIG. 1B illustrates an example implementation of the mobile device 120. The mobile device 120 can be any form of portable electronic device, such as a tablet, smart phone, smart watch, etc. The illustrated example mobile device 120 includes a user interface 121, such as a touchscreen allowing a user to interact with one or more apps or programs installed in the mobile device 120. The mobile device 120 includes a processor 122 operatively coupled with a communications interface 123. The communications interface 123 is operatively coupled with the industrial network 101 four wired or wireless communications there between. The processor 122 is operatively coupled to an electronic memory 124. The electronic memory 124 includes processor executable instructions to implement a program 126, including a communications component 127 and a chainable compute component 128, as well as data storage 129. The program instructions 126 in one example implement an app to perform the functions described herein, and a user can download the app to the mobile device 120. In operation, the mobile device 120 communicates with one or more of the intelligent industrial devices 102 and/or associated local HIMs 103, as well as with the controller 104 and/or the cloud-based server 109 via the cloud connection 108 as schematically illustrated in FIG. 1A. The mobile device 120 in one implementation can communicate with the intelligent industrial devices 102 either directly (e.g., via Bluetooth) or by accessing the industrial network 101 through the WAP 106 and browsing for intelligent industrial devices 102. The cloud connection 108 in one example facilitates accessing data uploaded to the cloud by the intelligent industrial devices 102 via the edge device 107. The cloud connection 108 in one example does not allow the mobile device 120 to interact with intelligent industrial devices 102 directly, although not a strict requirement of all possible implementations. In the illustrated example, the mobile device 120 can communicate with the cloud-based server 109 either directly by cellular connection to the cloud connection 108 and/or through the industrial network 101 via the edge device 107.

The industrial network 101 is configured to connect the mobile device 120 to the industrial system 100 and devices and components of the system 100. In operation, the communications of the network 101 delivers a chainable compute service assignment from a first intelligent industrial device 102 that assigns a chainable compute service to the mobile device 120 or from a cloud-based device or system such as the server 109 connected via the edge device 107 to the industrial network 101 that assigns the chainable compute service to the mobile device 120 to cause the mobile device 120 to perform the chainable compute service.

The mobile device 120 has an app (e.g., program instructions 126 in the memory 124) and can operate as a computation resource or service, referred to as a chainable compute service for the industrial system 100. This allows an intelligent industrial device 102 and/or the controller 104 and/or the cloud-based sever 109 to offload one or more computational tasks to be performed by the mobile device 120. The mobile device 120 can connect wirelessly to the industrial network 101, for example, via the WAP 106 or via a wireless equipped HIM 103, 110, 136. The mobile device 120 can present itself in the form of a pluggable option module or chainable compute service to an intelligent industrial device 102 or to a cloud-based device or system (e.g., server 109). The mobile device can upload data from the data buffer 130 of the intelligent industrial device 102 or other requesting system component 104, 109, perform some calculations or some feature extraction, or troubleshooting, or analytics, and in certain examples perform one or more actions based on the results. The mobile device 120 can implement different tasks such as commissioning and/or configuring an intelligent industrial device 102, troubleshooting, performing trending or other analytics, for example, as described further below in connection with FIG. 2. Troubleshooting in one example includes problem solving to find and correct issues with machines, electronics, computational components and software in an intelligent industrial device 102 and/or the system 100, such as gathering information on an undesired behavior or a lack of expected functionality, isolating a problem, diagnosing the problem and identifying one or more solutions, etc. Commissioning in one example includes putting an intelligent industrial device 102 or system into commission, including initial start-up. Configuration is the act of configuring an intelligent industrial device 102 or system for operation, including adjusting parameters and/or settings. Configuration can be included in commissioning, and configuration could also take place after commissioning (e.g., for optimizing or otherwise improving or adjusting system and/or device operation).

In one example, a first one of the intelligent industrial devices 102 is a motor drive that acquires high speed data from the associated motor load M or from the process that controls it and the first intelligent industrial device 102 buffers the data in its own data buffer 130. The mobile device 120 establishes a connection with the industrial network 101 and identifies itself to other devices on the industrial network 101 as being able and available to implement one or more assigned chainable compute services. In one example, the mobile device presents itself to the industrial network 101 with a listing of chainable compute services that it is able to perform, and may include an indication of any capability or capacity limitations or restrictions, for example bandwidth, memory size, etc. The first intelligent industrial device 102 in one example sends an assignment request to the mobile device 120 via the industrial network 101, and the mobile device 120 accepts the assignment of the chainable compute service.

While remaining in connected communications, the mobile device 120 implements the assigned chainable compute service and operates as an executable component that can acquire the data from the intelligent industrial device buffer 130 (and/or elsewhere within the industrial system including a buffer 130 of the controller 104 and/or of the cloud-based server 109). In one example, the mobile device 120 performs some feature extraction and data processing to monitor for some condition(s) in the first intelligent industrial device 102, or in a second intelligent industrial device 102 of the industrial system 100, for example, by time domain or frequency domain processing on the data from the buffer 130 to determine something about the condition of a driven motor M or the condition of the load that the motor M is driving. In one example, feature extraction includes pre-processing raw input signals, such as through time or frequency domain techniques, in order to facilitate machine learning, starting with an initial set of data and reducing the initial data by building a derived set of values that is smaller while preserving the information in the original data set. One example could be performing fast Fourier transform (FFT) computations on motor current signals and uploading the outcome to an analytics engine for condition monitoring (e.g., winding degradation, bearing degradation, etc.), where the processed data (e.g., features) can be much smaller than the raw data set, while preserving all the relevant information.

In another example during intelligent industrial device configuration, the mobile device 120 implements a chainable compute service that analyzes the device configuration. If two intelligent industrial devices were similar components (e.g., both drives) the mobile device 120 can get access to the industrial network 101 and compare configurations of two or more of the intelligent industrial devices 102 or versions. In one example, the mobile device 120 implements a conversion tool or component (e.g., of the chainable compute component 128 in FIG. 1B) to convert from one version or type of drive to another. As the mobile device 120 reads the configuration from one instance of an intelligent industrial device 102 to another, the mobile device can determine whether or not two intelligent industrial devices 102 are identical enough for direct transfer of a configuration or version, and if so, the mobile device 120 can implement a conversion from the configuration of one intelligent industrial device 102 to the other, for example, setting the second intelligent industrial device 102 up to function in the same manner, including use of parameters of the second intelligent industrial device 102 that are converted by the mobile device 120 based on differences between the intelligent industrial devices. One example includes transferring the process settings from one drive to another when the two drives are controlling motors of different ratings, where the conversion tool implemented by the mobile device 120 includes the intelligence to know that process settings (e.g., the source of a speed reference, or the source of start/stop commands) could be the same even though the motor parameters are different between the two drives.

The mobile device 120 in another example compares configuration versions for one intelligent industrial device 102 or for different intelligent industrial devices 102. For example, the mobile device 120 can compare one intelligent industrial device 102 modified recently with another intelligent industrial device 102 that was modified months previously and is still stored and accessible, for example, in a configuration vault in the cloud server 109 or in a HIM 103, 110, 136 associated with one intelligent industrial device 102. For one intelligent industrial device 102, the stored data (e.g., buffer data in a buffer 130 accessible via the industrial network 101) can have multiple snapshots of the configuration for that intelligent industrial device 102 or different intelligent industrial devices 102 over time and the mobile device 120 can compare between them. The mobile device 120 implementing or otherwise performing a chainable compute service can do some analysis and compare between the versions from wherever the mobile device 120 is located.

In another example, the mobile device 120 can restore a previous configuration or version of an intelligent industrial device 102, for example, in response to detecting a problem with a new configuration or version, and/or if unexpected behavior is detected. One example of such behavior would be a driven motor drive exhibiting increased ripple current and/or excessive overshoot in its speed feedback due to the control loop gains having been modified. The mobile device 120 can identify or track changes over time to see what may have caused that behavior. The mobile device 120 can compare these trends, for example, by a user going around a factory and obtaining this data from different intelligent industrial devices 102 and/or by monitoring buffer data from multiple intelligent industrial devices 102 of the industrial system 100 via connection to or through the industrial network 101 (e.g., including access through the cloud connection 108 of FIG. 1) independent of the location of the mobile device 120 implementing the chainable compute service and independent of the system component that assigned the chainable compute service to the mobile device 120. The mobile device 120 can determine, for example, that one intelligent industrial device 102 trends better than another intelligent industrial device 102, and the mobile device 120 can select a set of parameters that are representative and compare between any two or more intelligent industrial devices 102 of the industrial system 100 to determine whether and/or why one intelligent industrial device 102 is running better or worse than another intelligent industrial device 102.

In another aspect, the mobile device 120 accesses the industrial system 100 to provide communications routing or bridging. The mobile device 120 can connect wirelessly to a HIM 103, 110, which then connects via a communications port (e.g., USB, CAN, etc.) or directly to a control board of an associated one of the intelligent industrial devices 102 with access to an industrial Ethernet network or other implementation or segment of the industrial network 101 to communicate with more than one intelligent industrial device 102 on the industrial network 101. Another networked intelligent industrial device 102 or dedicated edge device (e.g., edge device 107 in FIG. 1) can have edge software to operate as an edge device that allows the mobile device 120 to access the cloud connection 108 through the industrial network 101 and the edge device 107. Alternatively, or in combination, the mobile device 120 can access the cloud connection 108 through a cellular phone connection (e.g., connection 131 in FIG. 1). While connected to the industrial system 100 through a HIM 103, 110, 136 or the WAP 106 or the cellular connection 131, the mobile device 120 can operate as a chainable compute resource or service, and the mobile device 120 can automatically resume chainable compute tasks or functions when reconnecting to the HIM 103, 110, 136 or the WAP 106 or directly via the cellular connection 131, for example, when a user leaves the area and then comes back within wireless range of the HIM 103, 110, 136 or the WAP 106 or the cellular connection 131.

Figure 2:
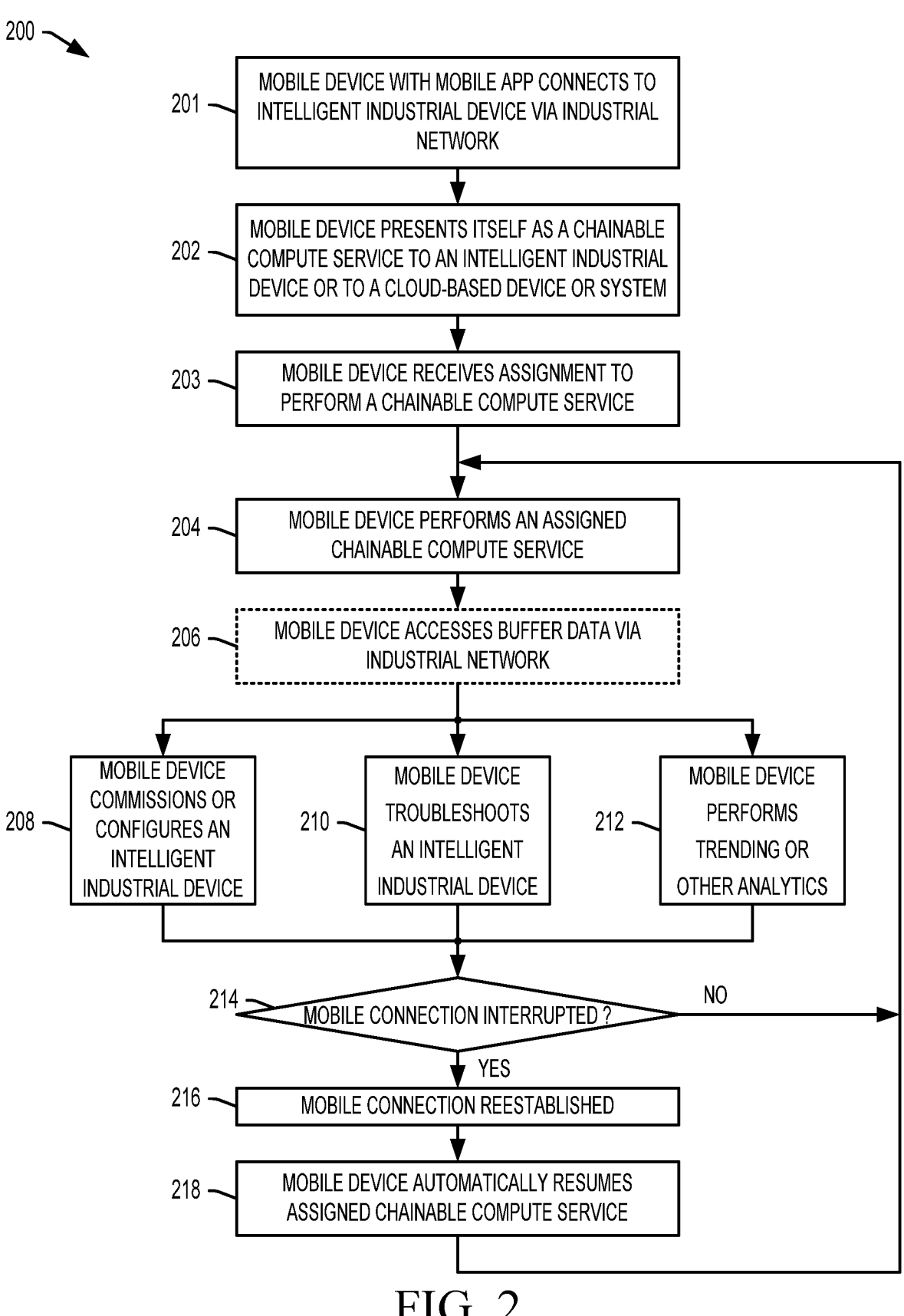
FIG. 2 is a flow diagram of a method.

FIG. 2 shows a method 200 that can be implemented, in whole or in part, using the mobile device 120 and industrial system 100 in one example. At 201 in FIG. 2, the mobile device 120 configured with a mobile app or other suitable program instructions (e.g., program 126 in FIG. 1B above) establishes a communications connection to an intelligent industrial device 102 via the industrial network 101.

At 202, in one example, the connected mobile device 120 presents itself to the industrial system 100 and the intelligent industrial devices 102 and connected cloud-based devices or systems (e.g., server 109) thereof as a chainable compute service. At 203, the connected mobile device 120 receives a chainable compute service assignment from a first intelligent industrial device 102 of the industrial system 100 that assigns a chainable compute service to the mobile device 120 or from a cloud-based device or system 109 connected to the industrial network 101 that assigns the chainable compute service to the mobile device 120. At 204, the mobile device 120 performs the chainable compute service. In one example, the mobile device 110 accesses data of a buffer 130 at 206 in FIG. 2 via the industrial network 101 of the industrial system 100 or via a cloud connection 108, for example, if such buffer data is needed or useful to perform the assigned chainable compute service.

In various implementations, the mobile device 120 implements one or more functions to perform the assigned chainable compute service, non-limiting examples of which are shown at 208, 210, and 212 in FIG. 2 and described below, and which can be performed by the mobile device 120 separately or in combinations. At 208, in one example, the mobile device 120 performs the assigned chainable compute service, including commissioning or configuring the first intelligent industrial device 102 or a second intelligent industrial device 102 connected to the industrial network 101 of the industrial system 100. In one implementation, commissioning or configuring the first or second intelligent industrial device 102 at 208 includes the mobile device 120 analyzing a configuration of the first or second intelligent industrial device 102. In these or another example, commissioning or configuring the first or second intelligent industrial device 102 at 208 includes the mobile device 120 comparing configurations of two intelligent industrial devices 102 of the industrial system 100. In these or another example, commissioning or configuring the first or second intelligent industrial device 102 at 208 includes the mobile device 120 comparing two versions of a configuration of the first or second intelligent industrial device 102. In these or another example, commissioning or configuring the first or second intelligent industrial device 102 at 208 includes the mobile device 120 determining whether two intelligent industrial devices 102 of the industrial system 100 are similar enough for direct transfer of a configuration or version. In these or another example, commissioning or configuring the first or second intelligent industrial device 102 at 208 includes the mobile device 120 converting first parameters of a configuration of the first intelligent industrial device 102 to second parameters of a configuration of the second intelligent industrial device 102. In these or another example, commissioning or configuring the first or second intelligent industrial device 102 at 208 includes the mobile device 120 restoring a previous configuration or version of the first or second intelligent industrial device 102.

In the above or another example, the mobile device 120 performing the chainable compute service includes the mobile device 120 troubleshooting the first intelligent industrial device 102 or a second intelligent industrial device 102 connected to the industrial network 101 of the industrial system 100 at 210 in FIG. 2. In one or more implementations, troubleshooting the first or second intelligent industrial device 102 at 210 includes the mobile device 120 identifying or tracking trends or behavior changes of the first or second intelligent industrial device 102 over time. In these or another example, troubleshooting the first or second intelligent industrial device 102 at 210 includes the mobile device 120 comparing trends or behavior changes of multiple intelligent industrial devices 102 of the industrial system 100. In these or another example, troubleshooting the first or second intelligent industrial device 102 at 210 includes the mobile device 120 determining whether or why one of the first and second intelligent industrial devices 102 is operating better than the other of the first and second intelligent industrial devices 102. In these or another example, troubleshooting includes the mobile device 120 reading and interpreting notifications (e.g., faults, alarms, and/or other informational events) logged in the intelligent industrial device 102 and issuing corrective recommendations based on accessing know product data (e.g., manuals) stored in the intelligent industrial device 102 and/or the cloud.

In the above or another example, the mobile device 120 performing the chainable compute service includes the mobile device 120 performing analytics at 212. In one or more examples, performing analytics at 212 includes the mobile device 120 identifying or tracking trends or behavior changes of the first intelligent industrial device 102 or a second intelligent industrial device 102 connected to the industrial network 101 of the industrial system 100 over time. In these or another example, performing analytics at 212 includes the mobile device 120 comparing trends or behavior changes of multiple intelligent industrial devices 102 of the industrial system 100. In these or another example, performing analytics at 212 includes the mobile device 120 determining whether or why one of the first and second intelligent industrial devices 102 is operating better than the other of the first and second intelligent industrial devices 102. In these or another example, performing analytics at 212 includes the mobile device 120 accessing data of a buffer 130 via the industrial network 101 of the industrial system 100 or via a cloud connection 108 (e.g., at 206 in FIG. 2).

In the above or other examples, performing 204 the chainable compute service includes the mobile device 120 automatically resuming a previously assigned chainable compute service in response to reconnecting to the industrial network 101 of the industrial system 100. At 214 in FIG. 2, the mobile device 120 and/or an assigning intelligent industrial device 102 and/or a connected cloud-based device or system (e.g., server 109) determines whether the mobile device 120 connection to the industrial system 100 (e.g., via one or more of the connections 131-134 in FIG. 1) has been interrupted. If not (NO at 214), the method 200 continues with the mobile device 120 performing the assigned chainable compute service at 204, 208, 210, and/or 214 and optionally accessing the buffer data from one or more of the buffers 130 at 206 as described above. During or after performance of an assigned chainable compute service, the mobile device 120 may receive another chainable compute service assignment and perform two or more assigned chainable compute services in certain examples.

If the connection of the mobile device 120 to the industrial system 100 is interrupted (YES at 214 in FIG. 2), the method 200 proceeds until the connection has been reestablished at 216. In response to the mobile device 120 reconnecting to the industrial network 101 of the industrial system 100 at 216, the mobile device automatically resumes one or more previously assigned chainable compute services at 218, and the method 200 continues as described above. The mobile device 120 may discontinue performing an assigned chainable compute service, for example, in response to the chainable compute service being terminated by the assigning intelligent industrial device 102 and/or cloud-based device or system (e.g., server 109), and/or when a fixed time chainable compute service has been completed and/or when the assigned chainable compute service is assigned for performance only until an event or condition occurs, and/or the mobile device 120 is no longer capable of performing the assigned chainable compute service. In one example, the mobile device 120 can notify the assigning intelligent industrial device 102 and/or cloud-based device or system that the performance of the assigned chainable compute service is being terminated and information regarding the reason for termination, for example, to facilitate reassignment of the service.

Various embodiments have been described with reference to the accompanying drawings. Modifications and changes may be made thereto, and additional embodiments may be implemented, without departing from the broader scope of the invention as set forth in the claims that follow. The specification and drawings are accordingly to be regarded in an illustrative rather than restrictive sense. The above examples are merely illustrative of several possible embodiments of various aspects of the present disclosure, wherein equivalent alterations and/or modifications will occur to others skilled in the art upon reading and understanding this specification and the annexed drawings. In addition, although a particular feature of the disclosure may have been disclosed with respect to only one of several implementations, such feature may be combined with one or more other features of the other implementations as may be desired and advantageous for any given or particular application. Also, to the extent that the terms "including". "includes", "having", "has", "with", or variants thereof are used in the detailed description and/or in the claims, such terms are intended to be inclusive in a manner similar to the term "comprising".

The following is claimed:

1. A method, comprising:
using a mobile device connected to an industrial network of an industrial system:
    providing, to the industrial system, a listing of available chainable compute services;
    receiving a chainable compute service assignment to perform a chainable compute service from the listing of available chainable compute services, wherein the chainable compute service assignment is received from a remote device connected to the industrial network;
    performing the chainable compute service in response to the chainable compute service assignment;
    detecting an interruption in a connection between the mobile device and the industrial system during the performing the chainable compute service; and
    automatically resuming the chainable compute service when the connection is reestablished.

2. The method of claim 1, wherein the remote device comprises a first intelligent industrial device, and wherein performing the chainable compute service includes the mobile device commissioning or configuring at least one of the first intelligent industrial device or a second intelligent industrial device connected to the industrial network of the industrial system.

3. The method of claim 2, wherein commissioning or configuring at least one of the first or second intelligent industrial device includes the mobile device analyzing a configuration of the first or second intelligent industrial device.

4. The method of claim 2, wherein commissioning or configuring at least one of the first or second intelligent industrial device includes the mobile device comparing configurations of the first intelligent industrial device and the second intelligent industrial device of the industrial system.

5. The method of claim 2, wherein commissioning or configuring at least one of the first or second intelligent industrial device includes the mobile device comparing two versions of a configuration of the first or second intelligent industrial device.

6. The method of claim 2, wherein commissioning or configuring at least one of the first or second intelligent industrial device includes the mobile device determining whether the first intelligent industrial device and the second intelligent industrial device of the industrial system are compatible with a direct transfer of a configuration or version.

7. The method of claim 2, wherein commissioning or configuring at least one of the first or second intelligent industrial device includes the mobile device converting first parameters of a configuration of the first intelligent industrial device to second parameters of a configuration of the second intelligent industrial device.

8. The method of claim 2, wherein commissioning or configuring at least one of the first or second intelligent industrial device includes the mobile device restoring a previous configuration or version of the first or second intelligent industrial device.

9. The method of claim 1, wherein the remote device comprises a first intelligent industrial device, and wherein performing the chainable compute service includes the mobile device troubleshooting at least one of the first intelligent industrial device or a second intelligent industrial device connected to the industrial network of the industrial system.

10. The method of claim 9, wherein troubleshooting at least one of the first or second intelligent industrial device includes the mobile device identifying or tracking trends or behavior changes of the first or second intelligent industrial device over time.

11. The method of claim 10, wherein troubleshooting at least one of the first or second intelligent industrial device includes the mobile device comparing trends or behavior changes of multiple intelligent industrial devices of the industrial system.

12. The method of claim 11, wherein troubleshooting at least one of the first or second intelligent industrial device includes the mobile device determining whether or why one of the first and second intelligent industrial devices is operating better than the other of the first and second intelligent industrial devices.

13. The method of claim 9, wherein troubleshooting at least one of the first or second intelligent industrial device includes the mobile device interpreting notifications logged in the first or second intelligent industrial device.

14. The method of claim 1, wherein performing the chainable compute service includes the mobile device performing analytics.

15. The method of claim 14, wherein the remote device comprises a first intelligent industrial device, and wherein performing analytics includes the mobile device identifying or tracking trends or behavior changes of at least one of the first intelligent industrial device or a second intelligent industrial device connected to the industrial network of the industrial system over time.

16. The method of claim 15, wherein performing analytics includes the mobile device comparing trends or behavior changes of multiple intelligent industrial devices of the industrial system.

17. The method of claim 16, wherein performing analytics includes the mobile device determining whether or why one of the first and second intelligent industrial devices is operating better than the other of the first and second intelligent industrial devices.

18. The method of claim 14, wherein performing analytics includes the mobile device accessing data of a buffer via the industrial network of the industrial system or via a cloud connection.

19. The method of claim 1, wherein the remote device comprises a motor drive.

20. The method of claim 1, wherein performing the chainable compute service includes the mobile device accessing data of a buffer via the industrial network of the industrial system or via a cloud connection.

21. An industrial system, comprising:

an industrial network;

an intelligent industrial device operatively connected to the industrial network, the industrial network configured to connect a mobile device to the industrial system and deliver a chainable compute service assignment; and the mobile device configured to:

provide, to the industrial network, a listing of available chainable compute services;

receive the chainable compute service assignment to perform a chainable compute service from the listing of available chainable compute services, wherein the chainable compute service assignment is received from the intelligent industrial device;

perform the chainable compute service in response to the chainable compute service assignment;

detect an interruption in a connection between the mobile device and the industrial network during the performing the chainable compute service; and automatically resume the chainable compute service when the connection is reestablished.

22. A non-transitory computer readable medium having computer executable instructions which, when executed by a processor of a mobile device connected to an industrial network of an industrial system, cause the mobile device to:

receive a chainable compute service assignment from a first intelligent industrial device of the industrial system that assigns a chainable compute service to the mobile device; and perform the chainable compute service, wherein the performing the chainable compute service comprises configuring the first intelligent industrial device, and wherein the configuring comprises:

determining whether the first intelligent industrial device is compatible with a direct transfer of a configuration associated with a second intelligent industrial device; and converting first parameters of a configuration of the first intelligent industrial device to second parameters of a configuration of the second intelligent industrial device.

* * * * *